(12) United States Patent
Kinoshita et al.

(10) Patent No.: US 6,493,783 B1
(45) Date of Patent: Dec. 10, 2002

(54) UNDOCKING METHOD FOR MULTILAYER-DOCK STRUCTURE CONSTITUTED BY DOCKING PLURALITY OF EXPANSION UNITS TO A PORTABLE PC

(75) Inventors: Hidenori Kinoshita, Machida (JP); Yasuhiro Kobayashi, Atsugi (JP); Takayuki Katoh, Yokohama (JP); Shinobu Miyachi, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,795

(22) Filed: Apr. 11, 2000

(30) Foreign Application Priority Data

Apr. 13, 1999 (JP) .......................................... 11-104944

(51) Int. Cl.[7] .............................................. G06F 13/00
(52) U.S. Cl. ...................................... 710/303; 361/686
(58) Field of Search ........................ 710/100, 300–304, 710/104, 8–19; 713/1, 2, 100; 361/683–686, 728–735

(56) References Cited

U.S. PATENT DOCUMENTS 5,805,412 A * 9/1998 Yanagisawa et al. ....... 361/686
5,873,000 A * 2/1999 Lin et al. ...................... 710/72
5,875,307 A * 2/1999 Ma et al. .................... 710/304
6,195,718 B1 * 2/2001 Hennessy et al. ........... 710/304
6,309,230 B2 * 10/2001 Helot .......................... 361/683

OTHER PUBLICATIONS

Patent Abstract of Japan; Publication date: Mar. 31, 2000, No., 2000-089855.

* cited by examiner

Primary Examiner—Sumati Lefkowitz
(74) Attorney, Agent, or Firm—Carlos Munoz-Bustamante (57) ABSTRACT

Described is an improved method for undocking a structure having an optional number of tiers from a multilayer-dock structure constituted by docking a plurality of expansion units respectively having an intrinsic resource to a portable PC. To undock only a portable PC from a triple-layer-dock structure constituted by docking a first expansion unit and a second expansion unit to the portable PC, the first expansion unit is made to generate an undock event. The IDE device of the first expansion unit and the PCI device of the second expansion unit are separated from the control by an operating system by taking the undock event as an opportunity and the interfaces of the devices and are electrically separated. The operability is improved because it is possible to unitedly obtain an object to be undocked through both vision and operation.

16 Claims, 4 Drawing Sheets

UNDOCKING METHOD FOR MULTILAYER-DOCK STRUCTURE CONSTITUTED BY DOCKING PLURALITY OF EXPANSION UNITS TO A PORTABLE PC

BACKGROUND OF THE INVENTION

1. Field of the Invention

The present invention relates to an undocking method for a multilayer-dock structure constituted by docking a plurality of expansion units to a portable PC.

2. Description of Related Art

In recent years, portable personal computers (hereafter referred to as portable PCs) having various sizes and functions have been developed because mobile computing has been spread. For example, there is a notebook-type personal computer (PC), a sub-notebook-type PC, palm-top-type PC, and a PDA (personal data assistant; which may be translated as portable information terminal). The functions to be provided for the portable PC are limited. Therefore, when it is necessary to expand the functions, one or more expansion unit is or are connected to the portable PC. The expansion unit is referred to as a docking station or port replicator.

A portable PC and an expansion unit are electrically connected with each other through a connector and thereafter, logically connected with each other. This operation is referred to as docking. Even if a portable PC and an expansion unit are only electrically connected, the portable PC cannot operate the expansion unit. To make it possible for the portable PC to use the expansion unit, it is necessary for an operating system (OS) to recognize the expansion unit. This is logical recognition. Docking is not completed until the OS logically recognizes the expansion unit and the portable PC is ready to use the expansion unit.

Electrically and logically separating a portable PC from an expansion unit is referred to as undocking.

Published Unexamined Patent Application No. 8-6668 discloses an art capable of smoothly docking also in a power saving mode such as a mode in which a portable computer is powered on or suspended. The essential point of the disclosed contents will be described below. When all signals are mechanically and collectively connected, it is possible to immediately use a port signal which can be hot-plugged when the signals are connected. However, for a bus signal which cannot be hot-plugged, it is possible to keep an electrical separation state when the signals are connected. Thereby, even if a user erroneously attempts docking under operation, it is possible to prevent the hardware from breaking.

The number of expansion units to be docked to a portable PC is usually one. However, it is preferable to prepare two types of expansion units (a first expansion unit and a second expansion unit) and dock either of them to the portable PC. For example, a CD-ROM drive or audio system is provided for the first expansion unit. Moreover, I/O ports such as a video port, printer port, mouse port, keyboard port, PCI device, and LAN port are provided for the second expansion unit. Then, a double-layer-dock structure constituted by docking the portable PC and the first expansion unit or a triple-layer-dock structure constituted by docking the portable PC, first expansion unit, and second expansion unit is realized. Thus, the triple-layer-dock structure can be used as a PC equivalent to a desktop-type PC. Moreover, the double-layer-dock structure can be used as a PC having a function between the portable PC alone and the triple-layer-dock structure.

As described above, when the triple-layer-dock structure is realized by docking the first expansion unit and second expansion unit to the portable PC, it can be used as a PC equivalent to a desktop-type PC. Therefore, the facility is improved. However, when hot-undocking only a portable PC from a triple-layer-dock structure, a problem occurs. Hot-undocking represents separating a portable PC under normal operation state from a triple-layer-dock structure. In this case, the normal operation state is a state other than power-off, suspend, hibernation, and standby states and a state capable of operating the PC. The first and second expansion units have devices according to standards different from each other as resources. As a result, when hot-undocking only the portable PC from the triple-layer-dock structure, it is necessary to separately eject the resource of the first expansion unit and that of the second expansion unit. That is, it may not be possible to undock both the first and second expansion units at the same time through one-time undocking operation. Therefore, because it is necessary to perform the undocking operation two times, a problem occurs in that the operability is deteriorated.

SUMMARY OF THE INVENTION

The present invention relates to a method for undocking a structure having an optional number of tiers from a multilayer-dock structure constituted by docking a plurality of expansion units respectively having an intrinsic resource to a portable PC.

A target expansion unit located immediately below a structure to be undocked and serving as an expansion unit in the multilayer-dock structure generates an undock event. A controller provided for the portable PC and receiving the undock event issues a system management interrupt. The service program of a system receiving the system management interrupt requests an operating system to separate resources of the target expansion unit and its low-order expansion unit from the control by the operating system. The operating system performs the operation for separating the resources from its control. The service program electrically separates interfaces of the resources. In this case, the service program is allowed to have an optional configuration as a part of an application program, device driver, or operating system.

Because the present invention is configured as described above, it is possible to unitedly obtain an object to be undocked through vision and operation and thereby, improve the operability.

DETAILED DESCRIPTION OF THE INVENTION

Figure 1:
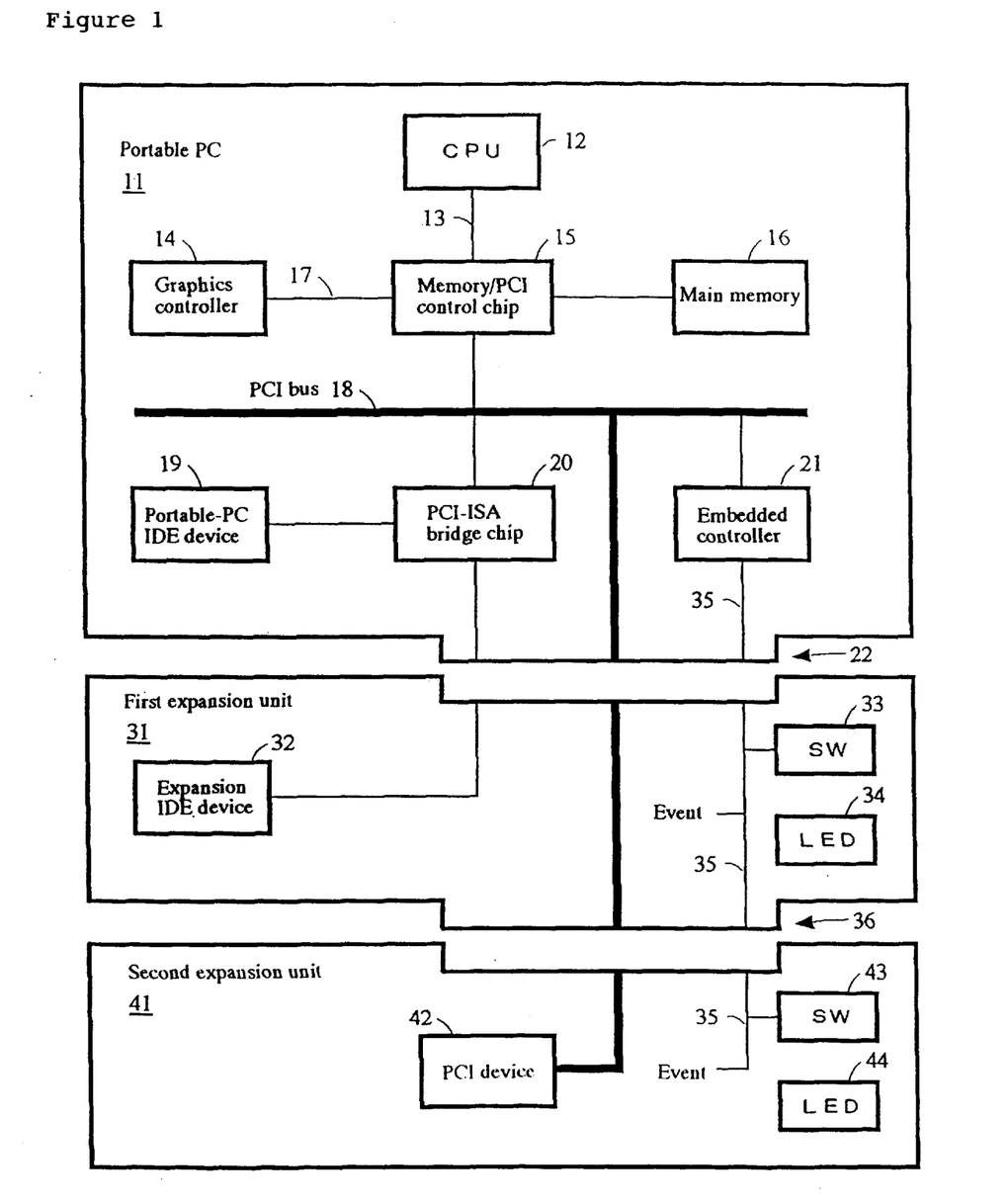
FIG. 1 is an illustration showing a portable PC, a first expansion unit, and a second expansion unit used for an embodiment of the present invention.

FIG. 1 is an illustration showing a portable PC 11, a first expansion unit 31, and a second expansion unit 41. The portable PC 11 is mainly configured by a central processing unit (CPU) 12, a CPU bus 13, a graphics mechanism 14, a memory/PCI control chip 15, a main memory 16, an AGP port 17, a PCI bus 18, a portable-PC IDE device 19, a PCI-ISA bridge chip 20, and an embedded controller 21.

The CPU 12 can use an x86-type microprocessor of Intel Corporation or a Power PC of International Business Machines Corporation or Motorola Inc.

The processor bus 13 is a very-high-speed bus for connecting the CPU 12, memory/PCI control chip 15, and main memory 16 with each other.

The graphics controller 14 controls an output to be supplied to a display unit such as a Cathode Ray Tube (CRT) or liquid crystal display (LCD). The graphics controller 14 and the memory/PCI control chip 15 are connected with each other by the Accelerated Graphics Port (AGP) port 17. An AGP is the standard of ports dedicated to graphics proposed by Intel Corporation. The AGP port is a port realizing high-speed drawing of graphics by directly connecting the graphics controller 14 and memory/PCI control chip 15 with each other without passing through the PCI bus 18.

The memory/PCI control chip 15 is a Large Scale Integrated Circuit (LSI) for connecting the CPU 12, main memory 16, and PCI bus 18 with each other. This is popularly referred to as "north bridge."

The main memory 16 is a memory constituted of a Dynamic Random Access Memory (DRAM) which can be directly read or written by the CPU 12 and which is used for a program such as an operating system (OS) or application program to store a program or data.

The Peripheral Component Interconnect (PCI) bus 18 is a bus having been recently used as a standard high-speed bus of a personal computer (PC). PCI represents a local bus architecture decided by a PCI Special Interest Group (standardization group in which more than one hundred companies including Intel Corporation, International Business Machines Corporation and Compaq Computer).

The PCI-ISA bridge chip 20 is connected to the PCI bus 18. This is popularly referred to as "south bridge." The PCI-ISA bridge chip 20 has a built-in IDE controller for controlling an Integrated Device Electronics (IDE) device. IDE represents one of the interfaces of a hard disk drive. IDE was standardized by hard disk drive makers at the beginning and thereafter, standardized as ATA (AT Attachment) by American National Standards Institute (ANSI). Then, the specification for connecting a CD-ROM drive to IDE interface was decided as an AT Attachment Packet Interface (ATAPI). A hard disk drive (HDD) and CD-ROM drive used for a personal computer are generally connected with each other by IDE.

Industry Standard Architecture (ISA) represents a bus standard used as an international standard based on an expansion bus used for the personal computer PC/AT of International Business Machines Corporation, USA.

The IDE device 19 is a hard disk drive (HDD) built in the portable PC 11 and is used to store programs such as an operating system (OS) and an application or data.

The embedded controller 21 controls various functions provided for the portable PC 11. For example, the controller 21 controls a keyboard and a mouse, power management, and docking/undocking of expansion units. The embedded controller 21 can use, for example, H8 of Hitachi, Ltd.

A first expansion unit 31 is docked to the portable PC 11 by a connector 22. The first expansion unit 31 is provided with, for example, an expansion IDE device (CD-ROM drive) 32, undock event switch (SW) 33, and status Light Emitting Diode (LED) 34. The expansion IDE-HDD 32 is controlled by an IDE controller provided for the PCI-ISA bridge chip 20 of the portable PC 11. An event signal line 35 reaching the embedded controller 21 set in the portable PC 11 is extended in the first expansion unit 31. The undock event switch (SW) 33 is connected to the event signal line 35 and moreover, an event in the first expansion unit 31 is transferred to the line 35 in the form of a pulse. Moreover, the PCI bus 18 in the portable PC 11 reaches the second expansion unit 41 by bussing through the first expansion unit 31.

A second expansion unit 41 is docked to the first expansion unit 31 by a connector 36. The second expansion unit 41 is provided with, for example, a PCI device 42, undock event switch (SW) 43, and status LED 44. The PCI device 42 is a resource connected to the PCI bus 18. For example, a PCI-PCI bridge chip, Local Area Network (LAN) card, or sound board is used as the resource. The event signal line 35 reaching the embedded controller 21 set in the portable PC 11 is extended into the second expansion unit 41. The undock event switch (SW) 43 is connected to the event signal line 35 and an event in the second expansion unit 41 is input to the line 35 in the form of a pulse.

Moreover, though not illustrated in FIG. 1, it is possible to provide functions of a port replicator for the second expansion unit 41. In this case, the I/O port of an I/O controller connected to an ISA bus output by the PCI/ISA bridge chip 20 in the portable PC 11 is extended up to the second expansion unit 41 by bussing through the first expansion unit 31 and various I/O ports are provided for the end of the I/O port. For example, various I/O ports include a serial port, parallel port, keyboard port, AUX port, and game port. Moreover, it is possible to use the output of a Universal Serial Bus (USB) controller built in the PCI/ISA bridge chip 20 of the portable PC 11 as a USB port. Furthermore, it is possible to use the output of a floppy disk (FD) controller of the portable PC 11 as an FDD port.

There are the following two ways for the undocking from a triple-layer-dock structure constituted by docking a first expansion unit 31 and a second expansion unit 41 to a portable PC 11.
(1) Undocking only the portable PC 11 by excluding a double-layer-dock structure constituted of the first expansion unit 31 and the second expansion unit 41, or
(2) Undocking a double-layer-dock structure constituted of the portable PC 11 and the first expansion unit 31 by excluding the second expansion unit 41

For simplicity, a case will be described below in which the first expansion unit 31 has an expansion IDE device 32 as a resource and the second expansion unit 41 has a PCI device 42 as a resource as shown in FIG. 1.

To undock the portable PC 11, there are two ways (1) and (2). In case of these two undocking ways, it is necessary to perform different undocking operations because resources to be ejected are different with each other.

To undock only the portable PC 11 as described in the above Item (1), it is necessary to eject the IDE device 32 and the PCI device 42.

To undock the portable PC 11 and the first expansion unit 31 docked to the portable PC 11, it is necessary to eject only the PCI device 42 of the second expansion unit 41. This is because, unless only the PCI device 42 is ejected, the IDE device 32 of the first expansion unit 31 cannot be used after undocking.

When unifying the above Items (1) and (2), that is, unifying ejecting operations of resources of the triple-layerdock structure, a trouble occurs that the IDE device 32 and PCI device 42 are always ejected at the same time.

To avoid the above problem, it is considered to restrict the ejecting operation of the resource of the second expansion unit 41 only to the PCI device 42 and the ejecting operation of the resource of the first expansion unit 31 only to the IDE device. In this case, however, another problem occurs in that the operability is deteriorated. For example, to undock only the portable PC 11 from the triple-layer-dock structure, it is necessary to undock the second expansion unit 41 and thereafter, further undock the first expansion unit 31. Therefore, as a result, the undocking operation must be performed two times.

To avoid the above problem, the following is performed in the case of this embodiment. That is, an undocking operation different for each object to be undocked is defined for the undocking from the triple-layer-dock structure constituted by docking the portable PC 11, first expansion unit 31, and second expansion unit 41. Thereby, a simple undocking operation is realized.

Specifically, the following is performed. To undock only the portable PC 11 from the triple-layer-dock structure, an undock event switch SW 33 provided for the first expansion unit 31 is operated. To undock the double-layer-dock structure for docking the first expansion unit 31 to the portable PC 11 from the triple-layer-dock structure, an undock event switch SW 43 provided for the second expansion unit 41 is operated.

Figure 2:
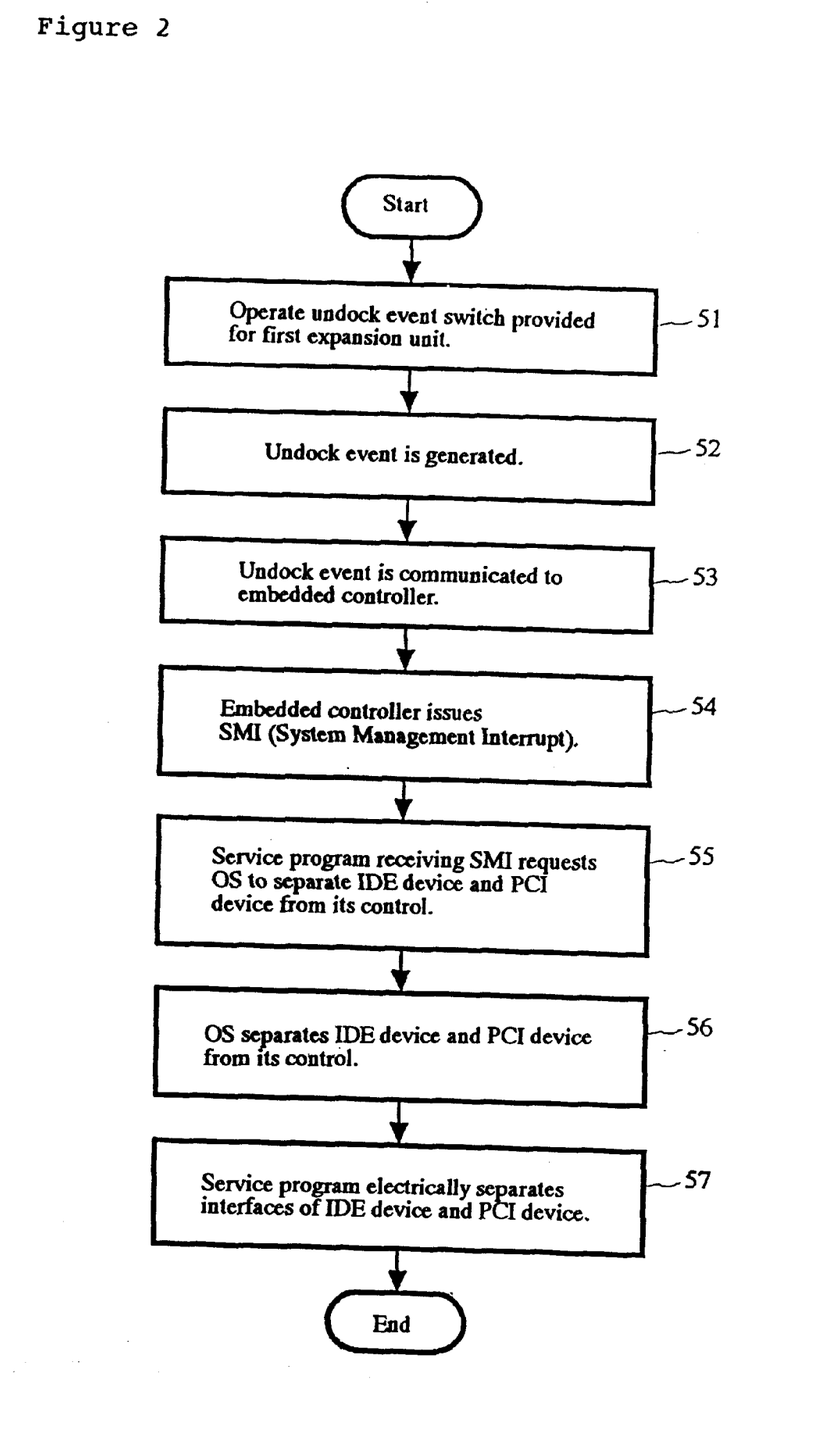
FIG. 2 is a flowchart showing the operation for undocking only a portable PC from a triple-layer-dock structure constituted by docking the portable PC, a first expansion unit, and a second expansion unit.

The operation for undocking only the portable PC 11 from the triple-layer-dock structure constituted by docking the portable PC 11, first expansion unit 31, and second expansion unit 41 will be described below by referring to the flowchart shown in FIG. 2.

First, the undock event switch SW 33 provided for the first expansion unit 31 is operated (step 51). Then, an undock event is generated (step 52). The undock event is communicated to an embedded controller 21 provided for the portable PC 11 as a runtime event after passing through an event signal line 35 (step 53). The embedded controller 21 receiving the runtime event issues a System Management Interrupt (SMI) to a system to request the system to execute the interrupt operation (step 54). The service program of the system receiving the SMI requests an operating system to separate the IDE device 32 and the PCI device 42 from its control (step 55). The service program is a system program constituting a part of a Basic Input/Output System (BIOS). The BIOS is software for converting the instruction of the OS into a command to be transferred to and from hardware. The BIOS is generally stored in a Read Only Memory (ROM) (not illustrated) set in the portable PC 11.

The OS performs the operation for separating the IDE device 32 and PCI device 42 from its control (step 56). When the operation is completed, the above service program electrically separates the interface of the IDE device 32 and that of the PCI device 42 (step 57). Thus, a series of undocking operations is completed.

Figure 3:
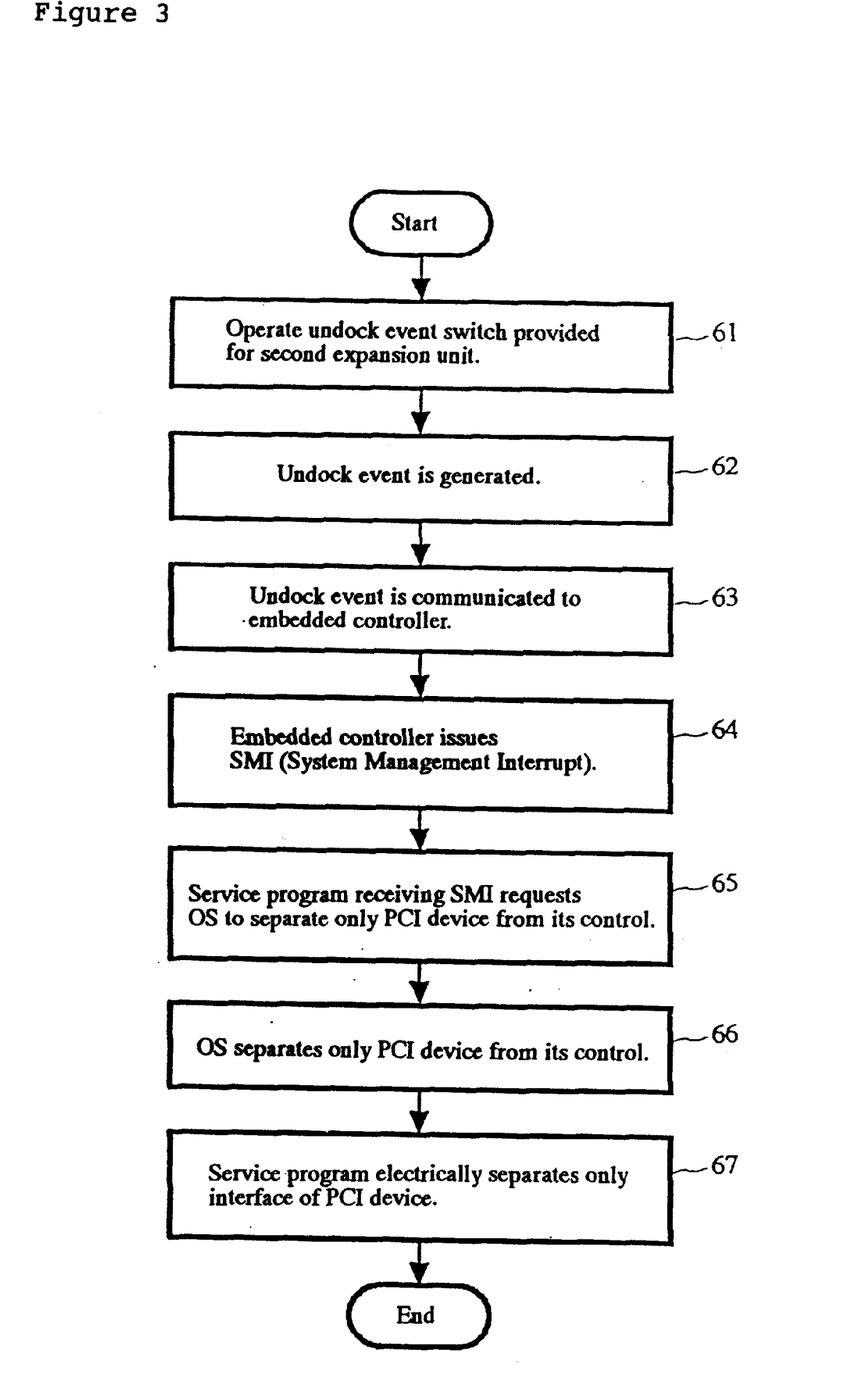
FIG. 3 is a flowchart showing the operation for undocking a double-layer-dock structure constituted by docking a first expansion unit to the portable PC from a triple-layer-dock structure.

Next, the operation for undocking the double-layer-dock structure constituted by docking the first expansion unit 31 to the portable PC 11 from a triple-layer-dock structure will be described below by referring to the flowchart shown in FIG. 3.

The undock event switch SW 43 provided for the second expansion unit 41 is operated (step 61). Then, an undock event is generated (step 62). The undock event is communicated to the embedded controller 21 provided for the portable PC 11 as a runtime event after passing through the event signal line 35 (step 63). The embedded controller 21 receiving the runtime event issues an SMI to a system to request the system to perform the interrupt operation (step 64). The service program of the system receiving the SMI requests the OS to separate only the PCI device 42 from its control (step 65). The service program is a program constituting a part of the BIOS. The OS performs the operation for separating only the PCI device 42 from its control (step 66). When the operation is completed, the service program electrically separates only the interface of the PCI device 42 (step 67). Thus, a series of undocking operations is completed.

As described above, in this embodiment, the undock event switch SW 33 provided for the first expansion unit 31 is operated to undock only the portable PC 11 from the triple-layer-dock structure and the undock event switch SW 43 provided for the second expansion unit 41 is operated to undock the double-layer-dock structure constituted by docking the first expansion unit 31 to the portable PC 11. Therefore, it is possible to unitedly obtain an object to be undocked through vision and operation.

It is necessary that the operation for undocking a portable PC 11 or a double-layer-dock structure constituted by docking a first expansion unit 31 to the portable PC 11 from a triple-layer-dock structure constituted by docking the first expansion unit 31 and a second expansion unit 41 to the portable PC 11 follows the undocking procedure specified by the ACPI OS. Advanced Configuration and Power Interface (ACPI) is a power control standard for personal computers jointly decided by Intel Corporation, Microsoft Corporation, and Toshiba CORP. ACPI OS is an operating system based on ACPI.

ACPI OS inhibits one-time undocking operation from being defined so as to nest a plurality of events for ejecting resources. However, ACPI OS allows one-time undocking operation to be defined so as to process a plurality of eject events. Therefore, it is permitted to define, for example, the operation for undocking the first expansion unit 31 preceding the operation for undocking only the portable PC 11 from a triple-layer-dock structure so as to eject the IDE device 32 of the first expansion unit 31 and the PCI device 42 of the second expansion unit 41 at the same time. With this assumption, if a double-layer-dock structure constituted by docking the first expansion unit 31 to the portable PC 11 is undocked from the triple-layer-dock structure, not only the PCI device 42 but also the IDE device 32 are ejected. Therefore, a problem occurs in that the IDE device 32 cannot be used immediately after undocking.

As described above, ACPI OS inhibits an eject event which calls another event to eject the PCI device 42 of the second expansion unit 41 after completing an event to eject the IDE device 32 of the first expansion unit 31. That is, ACPI OS inhibits a plurality of eject events from being nested in one-time undocking operation.

Therefore, it is necessary to define the undocking operation so as to meet either of the following two states.

(1) The undocking operation is defined so as to eject the PCI device 42 of the second expansion unit 41 and the IDE device 32 of the first expansion unit 31 one by one.

(2) The undocking operation is defined so as to eject the PCI device 42 of the second expansion unit 41 and the IDE device 32 of the first expansion unit 31 through a one-time undocking operation.

A case conforming to the above Item (1) will be described below. For example, it is assumed that the operation for undocking the second expansion unit 41 is defined as the undocking operation for ejecting the PCI device 42. In this case, it is impossible to define the operation for undocking the first expansion unit 31 as the undocking operation for ejecting the PCI device 42 and the IDE device 32. This is because ejection of the PCI device 42 is already defined in the operation for undocking the second expansion unit 41 and thereby, it is impossible to define ejection of the PCI device 42 again in accordance with the rules of ACPI OS. Therefore, it cannot be avoided to define the operation for undocking the first expansion unit 31 as the undocking operation for ejecting only the IDE device 32.

To undock only the portable PC 11 from the triple-layer-dock structure under the above state, it is necessary to undock the second expansion unit 41 and thereafter, further undock the first expansion unit 31. That is, it is necessary to perform the undocking operation twice. Therefore, this method has a disadvantage that the operability is deteriorated.

When defining the undocking operation so as to eject two devices different from each other in one-time undocking operation, a plurality of devices is ejected whenever performing the undocking operation. As a result, if the operation for undocking only the second expansion unit 41 from the triple-layer-dock structure is performed, the IDE device 32 of the first expansion unit 31 is also ejected. Therefore, to undock only the second expansion unit 41 from the triple-layer-dock structure, it is necessary to temporarily undock the second expansion unit 41 and then, dock the first expansion unit 31 again. Therefore, this method also has a disadvantage that the operability is deteriorated.

To avoid these disadvantages, the following are performed in this embodiment.

Figure 4:
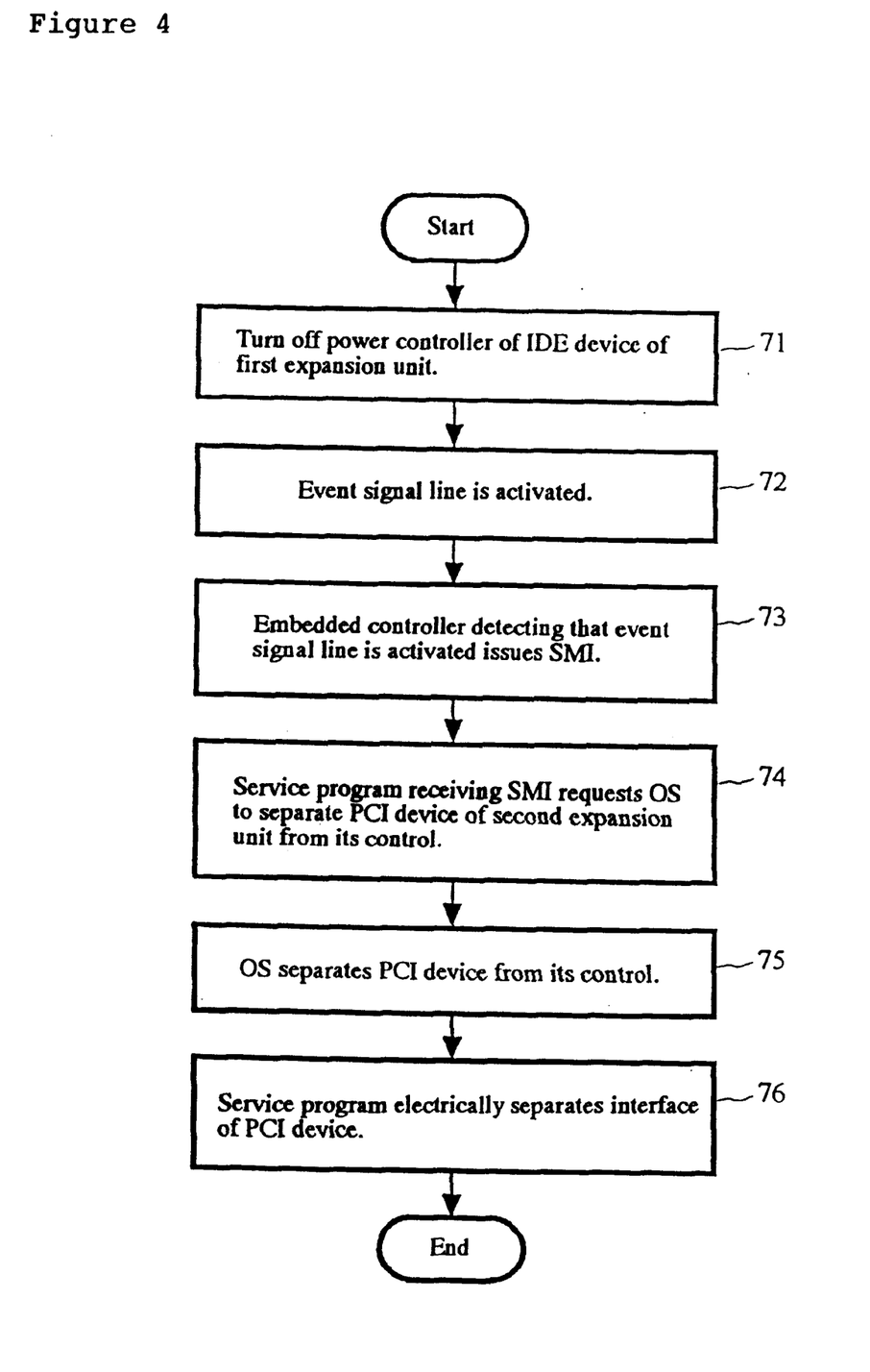
FIG. 4 is a flowchart showing the operation for undocking only a portable PC from a triple-layer-dock structure.

To undock only the portable PC 11 from the triple-layer-dock structure, when the operation for ejecting the IDE device 32 of the first expansion unit 31 is completed, the event for undocking the second expansion unit 41 is caused by using the completion of the above operation as a trigger. The undock event ejects the PCI device 42 of the second expansion unit 41. As a result, it is possible to undock only the portable PC 11 from the triple-layer-dock structure through a one-time undocking operation.

The operation for undocking only the portable PC 11 from the triple-layer-dock structure will be described below by referring to the flowchart shown in FIG. 4.

The power controller of the IDE device 32 of the first expansion unit 31 is turned off (step 71). This operation serves as an undock event and thereby, an event signal line 35 reaching an embedded controller 21 provided for the portable PC 11 after passing through the first expansion unit 31 from the second expansion unit 41 is activated (step 72). The embedded controller 21 detecting that the event signal line 35 is activated issues an SMI to a system to request the system to execute an interrupt operation (step 73). The service program of the system receiving the request requests the OS to separate the PCI device 42 of the second expansion unit 41 from its control (step 74). The service program is a program constituting a part of BIOS. The OS performs the operation for separating the PCI device 42 of the second expansion unit 41 from its control (step 75). When the operation is completed, the service program electrically separates the interface of the PCI device 42 (step 76). Thus, a series of undocking operations is completed.

According to this embodiment, it is possible to realize expected undocking through one-time undocking operation and therefore, the operability is improved.

The above-described undocking method of the present invention for a multilayer-dock structure constituted by docking a plurality of expansion units to a portable PC can be formed into a program (hereafter referred to as undocking program) by using various programming languages.

The undocking program is stored in a computer-readable recording medium. The recording medium is allowed to use a memory to be mounted on a computer system such as a Read Only Memory (ROM), Electrically Erasable Programmable Read Only Memory (EEPROM) and flash EEPROM, a portable recording medium such as a floppy disk (FD), CD-ROM (read only memory using compact disc) and Magneto-Optical (MO) disk, or an external storage provided for a server computer connected to a network.

An undocking program stored in a recording medium is captured into a computer as shown below. Hereafter, a system constituted of the portable PC 11, first expansion unit 31, and second expansion unit 41 shown in FIG. 1 is used as a computer.

A method for capturing an undocking program is divided into two types when a recording medium is a memory to be mounted on the portable PC 11. When the recording medium is a read only memory such as a ROM, an undocking program is printed into the ROM in a semiconductor fabrication process. Thereafter, the ROM is mounted on the portable PC 11.

When the recording medium is portable, for example, a CD-ROM, the CD-ROM storing an undocking program is set to the IDE device 32 of the first expansion unit 31 to read the undocking program from the CD-ROM. Then, its help display program is stored in the IDE device (IDE-HDD) 19 of the portable PC 11 or the undocking program is overwritten on the ROM. The same is true for a case in which the recording medium storing the undocking program uses another portable recording medium such as a floppy disk (FD) or MO disk.

When the recording medium is an external storage on a network, the undocking program stored in the external storage is downloaded through the network. It is possible to constitute a network connector as the PCI device 42 of the second expansion unit 41. The downloaded undocking program is stored and kept in the IDE device (IDE-HDD) 19 of the portable PC 11 similarly to the above-described case.

According to the present invention, it is possible to improve the operability because an object to be undocked can be obtained through vision and operation by using an undocking method for a multilayer-dock structure constituted by docking a plurality of expansion units to a portable PC.

While the invention has been particularly shown and described with respect to preferred embodiments thereof, it should be understood by those skilled in the art that the foregoing and other changes in forma and detail may be made therein without departing from the spirit and scope of the invention as defined in the appended claims.

What is claimed:

1. A method for undocking a structure having an optional number of tiers from a multilayer-dock structure constituted by docking a plurality of expansion units to a portable PC, the expansion units having an intrinsic resource respectively, comprising the steps of:

allowing a target expansion unit located immediately below a structure to be undocked and serving as an expansion unit in the multilayer-dock structure to generate an undock event;

allowing a controller, provided for a portable PC and receiving the undock event, to issue a system management interrupt;

allowing the service program of a system receiving the system management interrupt to request an operating system to separate resources of the target expansion unit and a lower-order expansion unit from the control by the operating system;

allowing the operating system to perform the operation for separating the resources from its control; and allowing the service program to electrically separate interfaces of the resources.

2. A method for undocking only a portable PC or a double-layer-dock structure constituted by docking a first expansion unit to the portable PC from a triple-layer-dock structure constituted by docking the first expansion unit and a second expansion unit to the portable PC, the first expansion unit and the second expansion unit having an intrinsic resource respectively, comprising the steps of:

allowing a target expansion unit located immediately below a structure to be undocked and serving as an expansion unit in the triple-layer-dock structure to generate an undock event;

allowing a controller, provided for a portable PC and receiving the undock event, to issue a system management interrupt;

allowing the service program of a system receiving the system management interrupt to request an operating system to separate resources of the target expansion unit and a lower-order expansion unit from the control by the operating system;

allowing the operating system to perform the operation for separating the resources from its control; and allowing the service program to electrically separate interfaces of the resources.

3. A method for undocking only a portable PC from a triple-layer-dock structure constituted by docking a first expansion unit and a second expansion unit to the portable PC the first expansion unit and the second expansion unit having an intrinsic resource respectively, comprising the steps of:

allowing the first expansion unit in the triple-layer-dock structure to generate an undock event;

allowing a controller, provided for a portable PC and receiving the undock event, to issue a system management interrupt;

allowing the service program of a system receiving the system management interrupt to request an operating system to separate both the resource of the first expansion unit and the resource of the second expansion unit from the control by the operating system;

allowing the operating system to perform the operation for separating both the resource of the first expansion unit and the resource of the second expansion unit from its control; and allowing the service program to electrically separate the interface of the resource of the first expansion unit and the interface of the resource of the second expansion unit.

4. The undocking method according to claim 3, wherein the undock event generated by the first expansion unit in the triple-layer-dock structure is generated by operating an undock event switch provided for the first expansion unit.

5. The undocking method according to claim 3, wherein the undock event generated by the first expansion unit in the triple-layer-dock structure is generated by turning off a power controller for the resource of the first expansion unit.

6. A method for undocking a double-layer-dock structure constituted by docking a first expansion unit to a portable PC from a triple-layer-dock structure constituted by docking the first expansion unit and a second expansion unit to the portable PC, the first expansion unit and the second expansion unit having an intrinsic resource respectively, the method comprising the steps of:

allowing the second expansion unit to generate an undock event;

allowing a controller, provided for a portable PC and receiving the undock event, to issue a system management interrupt;

allowing the service program of a system receiving the system management interrupt to request an operating system to separate the resource of the second expansion unit from the control by the operating system;

allowing the operating system to perform the operation for separating the resource of the second expansion unit from its control; and allowing the service program to electrically separate the interface of the resource of the second expansion unit.

7. The undocking method according to claim 6, wherein the undock event generated by the second expansion unit is generated by operating an undock event switch provided for the second expansion unit.

8. The undocking method according to claim 6, wherein the undock event generated by the second expansion unit is generated by turning off the power controller of the resource of the second expansion unit.

9. A computer-readable recording medium storing an undocking program for a multilayer-dock structure constituted by docking a plurality of expansion units to a portable PC, which stores a program for undocking a structure having an optional number of tiers structure from a multilayer structure constituted by docking a plurality of expansion units respectively having an intrinsic resource to a portable PC; comprising the steps of:

allowing a target expansion unit located immediately below a structure to be undocked and serving as an expansion unit in the multilayer-dock structure to generate an undock event;

allowing a controller provided for a portable PC and receiving the undock event to issue a system management interrupt;

allowing the service program of a system receiving the system management interrupt to request an operating system to separate resources of the target expansion unit and a lower-order expansion unit from the control by the operating system;

allowing the operating system to perform the operation for separating the resources from its control; and allowing the service program to electrically separate interfaces of the resources.

10. A computer-readable recording medium storing an undocking program for a multilayer-dock structure constituted by docking a plurality of expansion units to a portable PC, which stores a program for undocking only the portable PC or a double-layer-dock structure constituted by docking a first expansion unit to the portable PC from a triple-layer-dock structure constituted by docking the first expansion unit and a second expansion unit respectively having an intrinsic resource to the portable PC, comprising the steps of:

allowing a target expansion unit located immediately below a structure to be undocked and serving as an expansion unit in the triple-layer-dock structure to generate an undock event;

allowing a controller, provided for a portable PC and receiving the undock event, to issue a system management interrupt;

allowing the service program of a system receiving the system management interrupt to request an operating system to separate resources of the target expansion unit and a lower-order expansion unit from the control by the operating system;

allowing the operating system to perform the operation for separating the resources from its control; and allowing the service program to electrically separate interfaces of the resources.

11. A computer-readable recording medium storing an undocking program for a multilayer-dock structure constituted by docking a plurality of expansion units to a portable PC, which stores a program for undocking only the portable PC from a triple-layer-dock structure constituted by docking a first expansion unit and a second expansion unit respectively having an intrinsic resource to the portable PC, comprising the steps of:

allowing the first expansion unit in the triple-layer-dock structure to generate an undock event;

allowing a controller provided for a portable PC and receiving the undock event to issue a system management interrupt;

allowing the service program of a system receiving the system management interrupt to request an operating system to separate the resource of the first expansion unit and the resource of the second expansion unit from the control by the operating system;

allowing the operating system to perform the operation for separating the resource of the first expansion unit and the resource of the second expansion unit from its control; and allowing the service program to electrically separate the interface of the resource of the first expansion unit and the interface of the resource of the second expansion unit.

12. The computer-readable recording medium according to claim 11, wherein the undock event generated by the first expansion unit in the triple-layer-dock structure is generated by operating an undock event switch provided for the first expansion unit.

13. The computer-readable recording medium according to claim 11, wherein the undock event generated by the first expansion unit in the triple-layer-dock structure is generated by turning off a power controller for the resource of the first expansion unit.

14. A computer-readable recording medium, which stores a program for undocking a double-layer-dock structure constituted by docking a first expansion unit to the portable PC from a triple-layer-dock structure constituted by docking the first expansion unit and a second expansion unit respectively having an intrinsic resource to the portable PC, comprising the steps of:

allowing the second expansion unit to generate an undock event;

allowing a controller provided for a portable PC and receiving the undock event to issue a system management interrupt;

allowing the service program of a system receiving the system management interrupt to request an operating system to separate the resource of the second expansion unit from the control by the operating system;

allowing the operating system to perform the operation for separating the resource of the second expansion unit from its control; and allowing the service program to electrically separate the interface of the resource of the second expansion unit.

15. The computer-readable recording medium according to claim 14, wherein the undock event generated by the second expansion unit is generated by operating an undock event switch provided for the second expansion unit.

16. The computer-readable recording medium according to claim 14, wherein the undock event generated by the second expansion unit is generated by turning off the power controller of the resource of the second expansion unit.

* * * * *